United States Patent
Lindsay (10) Patent No.: US 10,229,167 B2
(45) Date of Patent: Mar. 12, 2019

(54) RANKING DATA ITEMS BASED ON RECEIVED INPUT AND USER CONTEXT INFORMATION

(71) Applicant: Facebook, Inc., Menlo Park, CA (US)

(72) Inventor: Robert Taaffe Lindsay, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 202 days.

(21) Appl. No.: 13/779,481

(22) Filed: Feb. 27, 2013

(65) Prior Publication Data

US 2014/0244621 A1 Aug. 28, 2014

(51) Int. Cl.
*G06F 17/30* (2006.01)

(52) U.S. Cl.
CPC .... *G06F 17/30533* (2013.01); *G06F 17/3087* (2013.01); *G06F 17/30699* (2013.01); *G06F 17/30702* (2013.01); *G06F 17/30867* (2013.01)

(58) Field of Classification Search
CPC .......... G06F 17/3089; G06F 17/30038; G06F 17/276; G06F 17/30041; G06F 17/30044; G06F 17/30268; G06F 3/0237
USPC ................ 707/751, 724, 750, 722, 725, 767
See application file for complete search history.

(56) References Cited

U.S. PATENT DOCUMENTS

| | | | |
|---|---|---|---|
| 2010/0082431 A1* | 4/2010 | Ramer et al. | 705/14.52 |
| 2011/0137902 A1* | 6/2011 | Wable et al. | 707/737 |
| 2012/0166532 A1 | 6/2012 | Juan et al. | |
| 2012/0201362 A1* | 8/2012 | Crossan et al. | 379/88.01 |
| 2012/0233158 A1* | 9/2012 | Braginsky et al. | 707/724 |
| 2012/0324391 A1* | 12/2012 | Tocci | G06F 3/0237 |
| | | | 715/773 |

OTHER PUBLICATIONS

Kiefer, Bernd, Hans-Ulrich Krieger, and Detlef Prescher. "A novel disambiguation method for unification-based grammars using probabilistic context-free approximations." Proceedings of the 19th international conference on Computational linguistics—vol. 1. Association for Computational Linguistics, 2002.*

* cited by examiner

*Primary Examiner* — Robert W Beausoliel, Jr.
*Assistant Examiner* — Pedro J Santos
(74) *Attorney, Agent, or Firm* — Fenwick & West LLP (57) ABSTRACT

A composer interface allows a user to provide input, such as text data, to the social networking system. Based on context information associated with the user and received input, the social networking system presents candidate data items to the user. Selecting a candidate data item allows the user to include the candidate data item in the input. Examples of context information include: users connected to the user, profile information associated with the user, and geographic information associated with the user. The candidate data items may be presented based on the probability of the user selecting a candidate data item.

23 Claims, 4 Drawing Sheets

RANKING DATA ITEMS BASED ON RECEIVED INPUT AND USER CONTEXT INFORMATION

BACKGROUND

This invention relates generally to social networking systems and in particular to presenting actions or objects to a user providing content to a social networking system.

Social networking systems allow their users to efficiently communicate information with each other to encourage interactions between users. Social networking systems allow users to share content with each other, to create and maintain events for users to meet in person, to establish connections with other users, or to perform other interactions with each other. To encourage user interactions, social networking systems strive to streamline interactions between the user and the social networking system. For example, a social networking system provides its users with interfaces that seek to reduce the number of clicks to reach a page, to reduce the number of characters a user inputs to provide content to the social networking system, and to reduce clutter when presenting content to users. Simplifying user interactions with the social networking system increases the likelihood that users continue using a social networking system.

However, users increasingly access social networking systems, and other systems, through mobile devices. Many mobile devices are configured to receive user input using methods different from traditional user input methods, such as keyboard and mice. This use of different input methods limits the effectiveness of conventional techniques for simplifying user interaction with a social networking system. For example, conventional social networking systems lack the capability for effectively reducing the number of inputs (e.g., number of button presses or strokes) necessary for users to enter words or phrases for communication to the social networking system. Conventionally-used predictive text capabilities do not account for user-specific information, so they often do not suggest relevant words until after a user has entered a number of characters.

SUMMARY

A social networking system provides a user with a composer interface for receiving content from the user, such as posts of content to be presented to other social networking system users. To simplify entry of content, the social networking system analyzes input received via the composer interface and presents the user with candidate data items based on the input. Hence, based on the received input the social networking system identifies actions or objects and presents the actions or objects to the user as candidate data items. The candidate data items are ranked based on context associated with the user to reduce the number of data items presented to the user. Examples of context used for ranking include user profile information, prior user actions, connections between the user and other users or objects, temporal information, or other suitable information. Hence, as a user provides input via the composer interface, the social networking system displays actions or objects that are likely to correspond to what the user is inputting.

Rather than base the candidate data items on actions or objects commonly used by a general group of users, the social networking system selects and/or ranks the candidate data items based on contextual information associated with the user providing the input. This use of user-specific information reduces the potential candidate data items based on the user input or likely input. Probability values are generated for each candidate data item based on the likelihood of the user selecting a candidate data item based on the user's contextual information. Based on these probability values, the candidate data items are ranked and a subset of the candidate data items are presented based on the ranking.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other social networking system users. Users join the social networking system and add connections to a number of other users to which they desire to be connected. Social networking system users may provide information describing themselves, such as their age, gender, geographical location, education history, employment history, and the like. This user-provided information acts as personal context information and may be used by the social networking system to recommend groups, events, other users, actions, or other content to the user.

In addition to declarative information provided by users, the social networking system may also record users' actions performed internal to the social networking system and/or performed on external systems that communicate with the social networking system. Examples of external systems include third party sites, plug-ins, desktops, terminals, kiosks or other similar systems. The recorded actions are historical or social context information for the user. Examples of user actions include communications with other users, sharing content such as photos, interactions with content and advertisements, responding to a poll, attending an event, joining a group, modifying declarative information, or any other suitable action. Examples of data describing recorded actions performed external to the social networking system include websites visited websites, content with which the user interacted, and other suitable data. The social networking system may also use other information recorded by the user device or terminal/kiosk, such as surrounding environment (e.g., location, temperature, humidity, ambient noise), biometric data (e.g., heart rate, temperature, mood, activity, voice recognition), motion (e.g., accelerometer data, movement speed, shaking), detection of other users/devices and so forth, as part of recorded context information.

By analyzing stored information associated with a user, a social networking system may improve the services offered to users. For example, information associated with a user allows a social networking system to provide the user with content more likely to be of interest to the user. In various embodiments, the social networking system stores information associated with a user in one or more databases to simplify its retrieval.

Traditionally, users have been largely restricted to stationary computing devices, limiting the social networking system to obtaining information from users during the time when as user is using a stationary computing device. However, users are increasingly accessing social networking systems through mobile computing devices, such as smartphones and tablets. This allows a social networking system to receive a more continuous stream of information from its users. For example, users may "check-in" or indicate their current location via a mobile device, identify other users proximate to the user, comment on actions, view content relevant to a store or establishment where the user is located. Additional sensors and functionalities of mobile computing devices, such as global positioning systems (GPS), cameras, video cameras, voice recorders, and other systems further increases the information available to be sent to the social networking system.

Furthermore, the portability of mobile devices allows users to connect to and interact with a social networking system from a greater variety of locations than when using a stationary computing device. For example, users may compose posts or provide other content to a social networking system while away from home or work using a mobile computing device. As another example, users may provide comments while attending an event, such as a seminar or a concert. Interacting with the social networking system via a mobile computing device allows users to submit information in near real-time, which the social networking system may use to modify a dynamic profile of the user, which may be used to provide more personalized interactions with the social networking system for each user.

However, using a mobile computing device to compose posts or other content for communicating to the social networking system is relatively cumbersome for users. To generate a post, a user needs to input a significant number of strokes or button presses to enter the content for communication to the social networking system. This cumbersome input of multiple characters using small input devices of a mobile computing device may discourage users from social networking system use in part due to the inconvenience of typing a significant number of characters. Some online systems use predictive texting or word suggestions to allow users to provide content while entering a smaller number of characters. However, many conventional predictive word suggestions are based on commonly used words in the language used for the input. For example, suggested words are based on frequency with which words are used when speaking the language used, frequency with which words are used in literature, frequency with which words are used online, or other similar usage patterns. However, despite suggesting commonly used words, many conventional predictive text methods are often unable to accurately predict a user's intended word or phrase until after a significant number of characters have been entered.

However, using context data associated with a user, a social networking system may optimize word or phrase suggestions for individual users. Stored context data may be used to identify patterns in a user's behavior, such as using certain words in certain situations or places, commenting while attending certain types of events, and so forth. Context data may also be used to correlate geographical location tags (e.g., current location indicators or location indicators for past posts) with possible objects about which a user may want to post. For example, if a user is at a location associated with a restaurant by the social networking system, as the user enters content, the social networking system may suggest data items (e.g., words) include "eating," "drinking," or "waiting." Furthermore, the data items suggested by the social networking system may be presented in an order based on the likelihood of the user selecting a data item. For example, the data item most likely to be selected may be more prominently displayed. The suggested data items may also be filtered so that words or phrases not likely to be used (e.g., having less than a threshold likelihood of being selected by the user) are not presented to the user to not clutter the display.

Using context data associated with a user allows a social networking system to more accurately predict data items that the user may select for inclusion in content, such as a post, communicated to the social networking system. For example, when a user provides input via a composer interface provided by the social networking system, the social networking system generates candidate data items based on the input and the context information associated with the user. A set of the candidate data items are presented to the user via the composer interface and may be presented in an order based at least in part on the probability of the user selecting the candidate data items. In one embodiment, if there is less than a threshold probability of the user selecting a data item, the data item is not included in the set that is presented to the user. Alternatively, if at least one data item in the set of data items has less than a threshold probability of being selected by the user, an input interface (e.g., a keyboard) is displayed in the composer interface along with the set of candidate data items. The input interface allows the set of data items presented to the user to be easily modified by as additional inputs are received. As inputs are received via the input interface, the set of candidate data items is modified based on the input. If each of the set of data items has at least the threshold probability, the input interface may be removed while the set of data items remains displayed. In some embodiments, candidate item suggestions can be extended to systems outside of the social networking system. For example, the suggestion modules can be incorporated into iframes, Connect, plugins, programs, or desktop widgets that can recognize when a user is creating a post outside of the social networking system and provide similar candidate items as suggestions in the outside system.

The social networking system may further improve suggestions by using machine learning and modeling to determine patterns in the content provided to the social networking system by a user. As the user submits input describing objects to be posted to the social networking system, a database of content provided by the user is generated and may be used to develop models of words, phrases, or other data items provided by the user to the social networking system. These models may be used to quickly generate data items that a user has a high probability of using, without receipt of a significant amount of user inputs. In some embodiments, the social networking system may also generate an automatic post using generated data items without having the user type the post, based on knowing the user's current context and having a reasonable level of confidence in accuracy.

Story Composition and Data Item Ranking Environment

Figure 1:
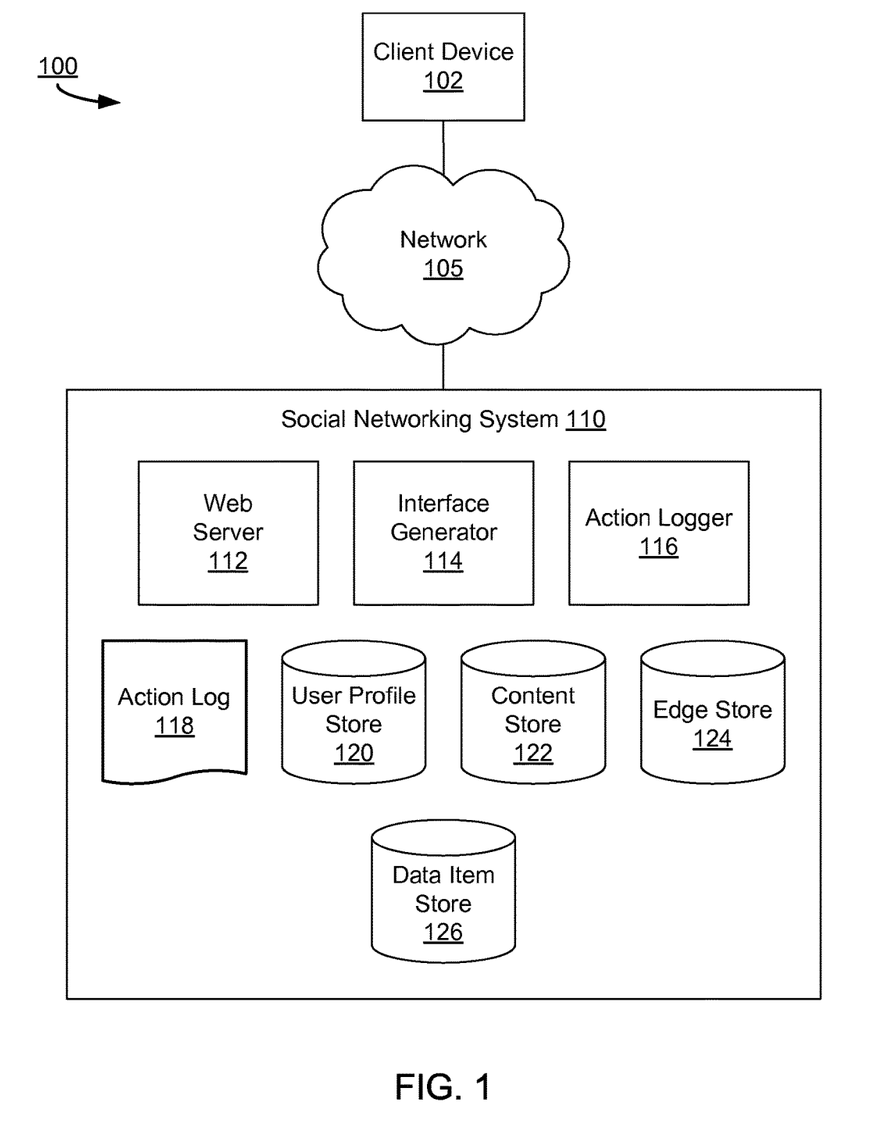
FIG. 1 is a block diagram illustrating a system environment including a social networking system, in accordance with an embodiment.

FIG. 1 is a block diagram of a system environment including a social networking system. The embodiment of the environment illustrated in FIG. 1 includes a client device 102, a network 105, and a social networking system 110. Other embodiments may include different and/or additional components than those shown by FIG. 1.

Client device 102 is a computing device capable of processing data as well as transmitting and receiving data via network 105. For example, client device 102 may be a desktop computer, a laptop computer, a smart phone, a tablet computing device, or any other device having computing and data communication capabilities. Client device 102 is coupled to network 105, which may comprise any combination of local area, cellular, wireless, and/or terrestrial communication systems.

Users of social networking system 110 may provide data to social networking system 110 using client device 102 and network 105. In use, users join social networking system 110 and add connections to other social networking system users. These connections may reflect connections existing outside of the social networking system 110, or "offline" relationships between users. Social networking system 110 may provide a user with stories describing actions or content associated with other social networking system users connected to the user.

Users of social networking system 110 may explicitly add or remove connections between themselves and other users and/or objects. In addition, some connections may be automatically created based on common characteristics between users or between users and objects. For example, social networking system 110 may create connections between users from the same educational institution or associated with the same organization. Connections maintained by social networking system 110 are often, but not necessarily, mutual; hence, some connections may be unilateral. For example, user A and user B are both users of social networking system 110 and connected to each other; thus, user A and user B have a bilateral connection where each may view information shared by the other user. However, user A may establish a connection with user C, while user C does not establish a connection to user A. Accordingly, a unilateral connection is formed between user A and user C where limited information may be shared between user A and user C. Although connections between users are often direct, some connections may be indirect, where indirectly connected users are separated by connections to one or more intermediate users (also referred to as "degrees of separation").

Social networking system 110 allows users to post and share stories describing themselves or their activities. A story may be presented to other users connected to a user posting or sharing the story, which enhances user interactions with social networking system 110. Stories may include any data a user may add, upload, send, transmit, or "post," to social networking system 110. For example, a user uploads a post to social networking system 110 from client device 102. The post may include textual data (e.g., comments, status updates, notes, or links), geographic location information, photos, videos, links, music, or other data. To compose a post on social networking system 110, users select characters by selecting or inputting characters through an input device of client device 102. Examples of methods for providing input via client device 102 include selecting characters from a displayed character array, typing on an external keyboard, drawing characters on a touchscreen display, selecting from a list of suggestions, or any other suitable technique. Input provided to client device 102 is communicated to social networking system 110 via network 105. Social networking system 110 analyzes the received input to identify data items based on the input.

Social networking system 110 comprises one or more computing devices that store information on a plurality of users, objects and connections between users and/or objects and allow users to interact with each other. In the embodiment illustrated in FIG. 1, social networking system 110 includes web server 112, interface generator 114, action logger 116, action log 118, user profile store 120, content store 122, and edge store 124, and data item store 126. Other embodiments of social networking system 110 may have different and/or additional components or may include fewer components than those shown in FIG. 1.

Web server 112 links social networking system 110 to client device 102 via network 105, and may link social networking system to one or more third-party systems via network 105. Web server 112 serves web pages, as well as other web-related content, such as JAVA®, FLASH®, XML and so forth. Web server 112 may receive and route messages between social networking system 110 and client device 102, for example, instant messages, queued messages (e.g., email), text and SMS (short message service) messages, or messages sent using any other suitable messaging technique. A user may send a request to web server 112 to upload information, for example, images or videos that are stored in content store 122, further described below. Additionally, web server 112 may provide application programming interface (API) functionality to send data directly to native client device operating systems, such as IOS®, ANDROID™, WEBOS® or RIM®.

Interface generator 114 processes data from other components of social networking system 110 and generates an interface that is communicated to client devices 102. Social networking system users view information from social networking system 110 and provide information to social networking system 110 via the interface. For example, information describing content presented by the interface and accessed by a user is communicated to social networking system 110, allowing social networking system 110 to maintain a record of content with which the user interacted. In one embodiment, interface generator 114 determines the interactions between the client device 102 and users via the interface and processes the interactions into formats used by other components of social networking system 110.

In one embodiment, interface generator 114 generates a composer interface for receiving data describing content from a user for distribution to social networking system users. When a user provides text content for communicating to social networking system 110, such as content for writing posts, making comments, entering search parameters, completing data forms and the like, interface generator 114 presents the user with a composer interface for entering text. For example, a user may access the composer interface by interacting with another interface presented by social networking system 110, causing interface generator 114 to present the composer interface. In one embodiment, the composer interface is a text entry region, such as a text box, and other composition-related icons and functions. Input received via the composer interface is communicated to social networking system 110, which stores the received input and retrieves context information associated with the user providing the input from one or more of action log 118, user profile store 120, content store 122, and edge store 124. Based on the context information and the received input, interface generator 114 identifies one or more suggested data items for presentation to the user as suggestions. In one embodiment, the context data allows social networking system 110 to identify patterns from content previously received from the user as the user provides input via the composer interface. For example, the user may begin typing "st" into a textbox and interface generator 114 may identify data items "studying for a test" along with other similar suggestions from the user's context information if users connected to the user have a similar post or if the user has previously provided a similar post.

In an embodiment, interface generator 114 determines probabilities of the user using an identified data item when providing input. These probabilities may be used to identify the data items presented to the user via the composer interface. For example, data items (e.g., words or phrases) having less than a threshold probability of use are not displayed via the composer interface. The composer interface may display the data items in an order based on their probabilities or may visually distinguish data items having a threshold probability from other data items presented to the user.

Action logger 116 receives information about user actions on social networking system 110, as well as actions performed outside of social networking system 110, and records this information in action log 118. Examples of actions include: adding a connection to another user, sending a message to another user, uploading an image, reading a message from another user, viewing content associated with another user, attending an event posted by another user, among others. In addition, a number of actions described in connection with other objects are directed at particular users, so these actions are associated with those users as well. These actions are stored in action log 118. Action logger may also receive system information from the device that the user actions took place on, such as from terminals, kiosks, mobile devices, computers and the like.

Action log 118 may be used by social networking system 110 to track user actions on social networking system 110, as well as on external systems that communicate information to social networking system 110. Users may interact with various objects on social networking system 110, including commenting on posts, sharing links, and checking-in to physical locations via a mobile device, accessing content items or other interactions. Information describing these actions is stored in action log 118. Additional examples of interactions described by data in action log 118 include commenting on a photo album, transmitting communication between users, becoming a fan of a musician, adding an event to a calendar, joining a group, becoming a fan of a brand page, creating an event, authorizing an application, using an application and engaging in a transaction. Additionally, action log 118 records a user's interactions with advertisements on social networking system 110 as well as other applications operating on social networking system 110. In some embodiments, data from action log 118 is used to infer interests or preferences of the user, augmenting the interests included in a user's user profile and allowing a more complete understanding of user preferences.

Action log 118 may also store user actions taken on external systems. For example, an e-commerce website that primarily sells sporting equipment at bargain prices may recognize a user of social networking system 110 through a social plug-in enabling the e-commerce website to identify the social networking system user. Because users of social networking system 110 are uniquely identifiable, third-party systems, such as this sporting equipment retailer, may use the information about these users as they visit their websites. Action log 118 records data about these users, including webpage viewing histories, advertisements that were engaged, purchases made, and other patterns from shopping and buying.

Social networking system 110 maintains a user profile for each of its users and stores these user profiles in user profile store 120. A user profile includes information about the user that the user has provided to social networking system 110, such as biographic information, demographic information, work experience, educational history, gender, hobbies or preferences, location and the like. However, user profiles may also include information inferred by social networking system 110, such as possible interests or connections to additional users. User profiles may also include information that are detected by a device and transmitted to the social networking system 110, such as biometric data or activity data. In one embodiment, a user profile includes various data fields, each describing one or more attributes about a corresponding social networking system user. A user profile may also store other information provided by the user, such as images, videos, comments, and other stories in which the user has been identified or "tagged." A user profile stored in user profile store 120 may also include links to content stored in content store 122, edge store 124, and/or action log 118 that is related to the user.

Content store 122 stores objects representing various types of content. Examples of content represented by an object include a page post, a status update, a photo, a video, a link, a shared content item, a gaming application achievement, a check-in event at a local business, a brand page, or any other type of content. Objects may be created by users of social networking system 110, such as status updates, photos tagged by users to be associated with other objects in the social networking system, events, groups or applications. In some embodiments, objects are received from third-party applications, which may be external to social networking system 110. Content "items" represent single pieces of content that are represented as objects in social networking system 110. Users of social networking system 110 are encouraged to communicate with each other by posting text and content items of various types of media through various communication channels, increasing the interaction of users with each other and increasing the frequency with which users interact with social networking system 110. Stories associated with users are also included in content store 122. As used herein, "stories" include any type of comments, notes, status updates, links, videos, pictures and the like. Objects are retrieved from content store 112 to present content to users via an interface or other suitable communication channel.

Edge store 124 stores information describing connections between users and other objects on social networking system 110 as edges. Some connections may be defined by users, allowing users to specify their relationships with other users. For example, users may generate edges with other users that parallel the users' real-life relationships, such as friends, co-workers, partners, and so forth. Other connections are generated when users interact with objects in social networking system 110, such as expressing interest in a page on the social networking system 110, sharing a link with other users of the social networking system 110, and commenting on posts made by other users of the social networking system 110. Edge store 124 may also record the changes in user connections over time. For example, when user A establishes a connection with user B, edge store 124 includes data identifying the type of connection, the time the connection was established, and may store other information associated with the connection, such as an application or process used to create the connection. In some embodiments, connections between users may be stored in user profile store 120, content store 122 or either of those stores may access edge store 124 to determine connections between users and other users or objects.

Information describing edges is also stored in edge store 124, such as affinity scores for objects, interests, and other users. Affinity scores may be computed by social networking system 110 over time to approximate a user's affinity for an object, interest, and other users in social networking system 110 based on the actions performed by the user. A user's affinity may be computed by social networking system 110 over time to approximate a user's affinity for an object, interest, and other users of social networking system 110 based on the actions performed by the user. Computation of affinity is further described in U.S. patent application Ser. No. 12/978,265, filed on Dec. 23, 2010, which is hereby incorporated by reference in its entirety. In various embodiments, multiple interactions between a user and a specific object may be stored in a single edge in edge store 124 or may be stored as multiple edges in edge store 124.

Data item store 126 includes words or phrases for social networking system users to include in content, such as posts, distributed by social networking system 110. These words or phrases may be acquired based on prior words or phrases that users have provided to the social networking system 110, or may be received from another source (e.g., a dictionary or external word bank). In some embodiments, data item store 126 includes words or phrases that may be considered as "slang" to account for contemporary changes in language or "online speech." Data item store 126 may include words from various languages to allow social networking system 110 to identify data items based on different languages. In some embodiments, data item store 126 is updated at intervals of time to add data items or to remove data items. In an embodiment, data item store 126 may also be optimized for speed by limiting the stored data items to words or phrases likely to be used in a social networking system 110.

Examples of Composer Interface

Figure 2A:
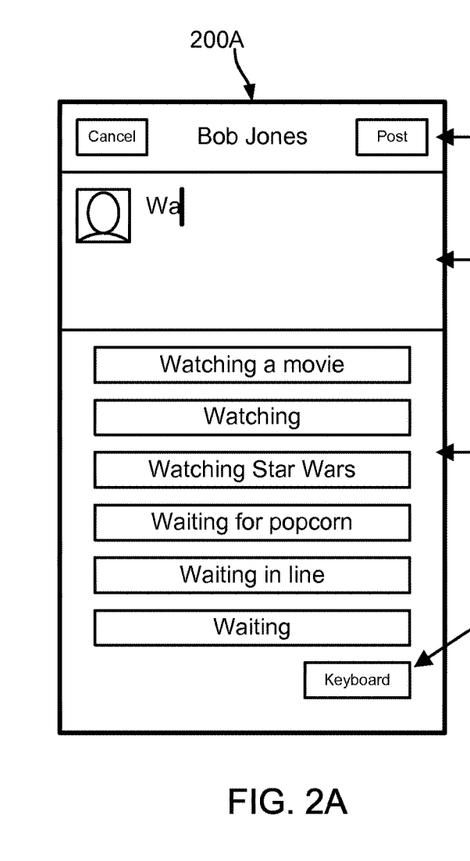
FIG. 2A is an illustration of a user interface displaying candidate data items for input, in accordance with an embodiment.
Figure 2B:
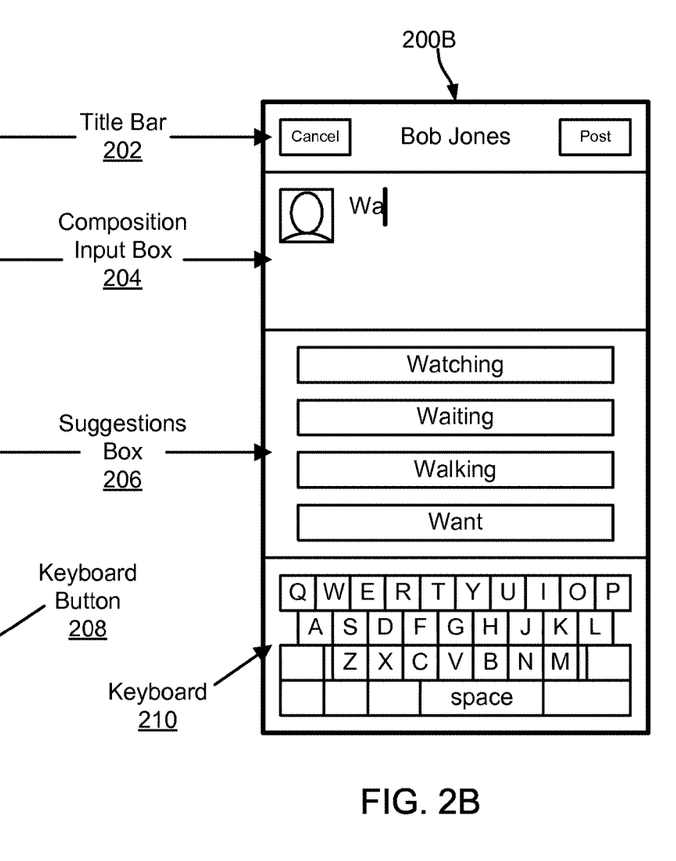
FIG. 2B is an illustration of another user interface displaying candidate data items for input, in accordance with an embodiment.

When a user provides content, such as a word or a command, to social networking system 110, composer interface 200 is presented to the user by the interface generator 114. Embodiments of a composer interface 200 are illustrated in FIGS. 2A and 2B. In the embodiments illustrated by FIGS. 2A and 2B, composer interface 200 is optimized for a mobile device (e.g., a smartphone or tablet). Different embodiments of composer interface 200 may be optimized for other types of computing devices, such as desktop computers or laptops.

Composer interface 200 may be dynamically modified. In FIG. 2A, interface generator 114 determines data items for suggestion to the user that have at least a threshold probability of being used based on context information associated with the user. However, in FIG. 2B, interface generator 114 determines data items having less than a threshold probability of being used based on the context information associated with the user. In one embodiment, as a user inputs characters into an input field of composer interface 220, interface generator 114 identifies candidate data items and presents a set of the candidate data items based on probabilities of the candidate data items being selected. If interface generator 114 presents a set of candidate data items having at least a threshold probability of being selected, the presentation of the set of candidate data items may be modified (e.g., from the composer interface 200B shown in FIG. 2B to the composer interface 200A shown in FIG. 2A). Conversely, if interface generator 114 presents a set of candidate data items having less than the threshold probability of being selected, interface generator 114 may present the composer interface 200B of FIG. 2B rather than the composer interface 200A of FIG. 2A.

Composer interfaces 200A, 200B (also referred to individually and collectively using reference number 200) have similar layouts. Composer interface 200 includes a title bar 202, composition input box 204 (e.g., a text field), and suggestions box 206. Composer interface 200A includes a keyboard button 208 for accessing a virtual keyboard while composer interface 200B presents a virtual keyboard 210. Other embodiments of a composer interface 200 may have different features than illustrated in FIGS. 2A and 2B. Features in composer interface 200 may also be interactive and/or dynamic. For example, accessing an icon or entering a gesture may cause presentation of various options within composer interface 200, such as options to attach videos or pictures to the post, perform a friends search, retrieve a GPS location, display an extended set of candidate data items, display various other types or language keyboards, or perform other suitable actions.

In an embodiment, title bar 202 provides basic information and options for composer interface 200. For example, title bar 202 identifies the name of the user providing input and options for submitting input to social networking system 110 or for cancelling submission of the input. Other embodiments may include different information, such as the name of the social networking system 110, the name of a recipient (if the post is on another user's page), the time, the location, the type of post and so forth. In various embodiments, title bar 202 may also include different options for manipulating composer interface 200, such as text field options, font and size changes, attachment options, program manipulation options, or other suitable options. Title bar 202 may also be located on a different region of the screen than shown in FIGS. 2A and 2B, in other embodiments.

Composition input box 204 displays input, such as characters, already provided to composer interface 200 by the user. Before a user provides input, composition input box 204 may be blank, may include a cursor indicating a text entry location, or a prompt (e.g., "What's on your mind?" or "Enter text here"), or have any other suitable format. As input is received from the user, composition input box 204 is updated to display characters corresponding to received inputs. Additional modifications to the composition input box 204 may be performed as input is received, such as repositioning the cursor or removing the prompt. Composition input box 204 may also include objects in addition to the text inputted by a user. For example, composition input box 204 in composer interfaces 200A, 200B include an image of the user providing the input. Other embodiments may include a brief summary of information about the user (e.g., name and age), reminders (e.g., current time or location), option buttons (e.g., icons for adding attachments to the post, icons for attaching metadata to the post, editing options and the like), or any other suitable information.

The size of composition input box 204 may be modified based on the amount input received as well as the size of other components displayed by composer interface 200. For example, composition input box 204 may increase in size, encroaching into space expand into space typically used for suggestions box 206, if the amount of input received from the user. In another embodiment, composition input box 204 may present a scroll bar allowing a user to scroll through the received input in the composition input box 204. Composition input box 204 may be reduced in size if less than a specified amount of input is received and the interface generator 114 determines that presenting an increased number of candidate data items would improve user interaction.

Suggestions box 206 displays a set of candidate data items selected based on context associated with the user and received input. Data items presented in the suggestions box 206*t* may be words or phrases are likely to complete a word or phrase including the received input. The set of candidate data items included in suggestions box 206 is modified as additional input is received from the user, allowing the suggestions box 206 to dynamically present different candidate data items based on user input. In composer interface 200A, suggestions box 206 covers a larger portion of the displayed interface than in composer interface 200B because the set of data items presented by composer interface 200A have at least a threshold probability of being selected by the user. Data items having at least the threshold probability of being selected may be more specific than data items having less than the threshold probability of being selected, so phrases, rather than single words, may be data items having at least the threshold probability of being selected. However, the probability of a user selecting a data item is not dependent on the specificity of a data item. The suggestions box 206 displayed in composer interface 200B occupies a smaller portion of the display area to allow presentation of a virtual keyboard 210 for receiving input. Various embodiments of the suggestions box 206 may display different numbers of data items and present data items in any suitable format (e.g., a list of tap icons, a list contained in a pull-down menu, a scrolling segmented bar, etc.). In some embodiments, composition input box 304 may display phrase object suggestions based on high confidence in the suggestions based on detected context information and/or previous actions without having received input from the user.

In embodiments of composer interface 200 designed for touch screen computing devices, a virtual keyboard 210 may be displayed for on-screen data entry. Users may select characters displayed for text entry and may also change between different keyboard displays (e.g., different sizes of keyboards, different keyboard layouts, different language keyboards). As described above, when data items having at least a threshold probability of being selected are displayed, a keyboard button 208 is displayed rather than the virtual keyboard 210. This increases the amount of display area for displaying data item while allowing the virtual keyboard 210 to be accessed via the keyboard button 208. If the displayed data items, or if a threshold number of displayed data items, have less than the threshold probability of selection, the virtual keyboard 210 may be displayed by default. Other embodiments of composer interface 200 that do not use on-screen data entry may not display keyboard 210 and receive input via an input device such as a physical keyboard or other suitable input device.

Ranking Data Items for Suggestion

Figure 3:
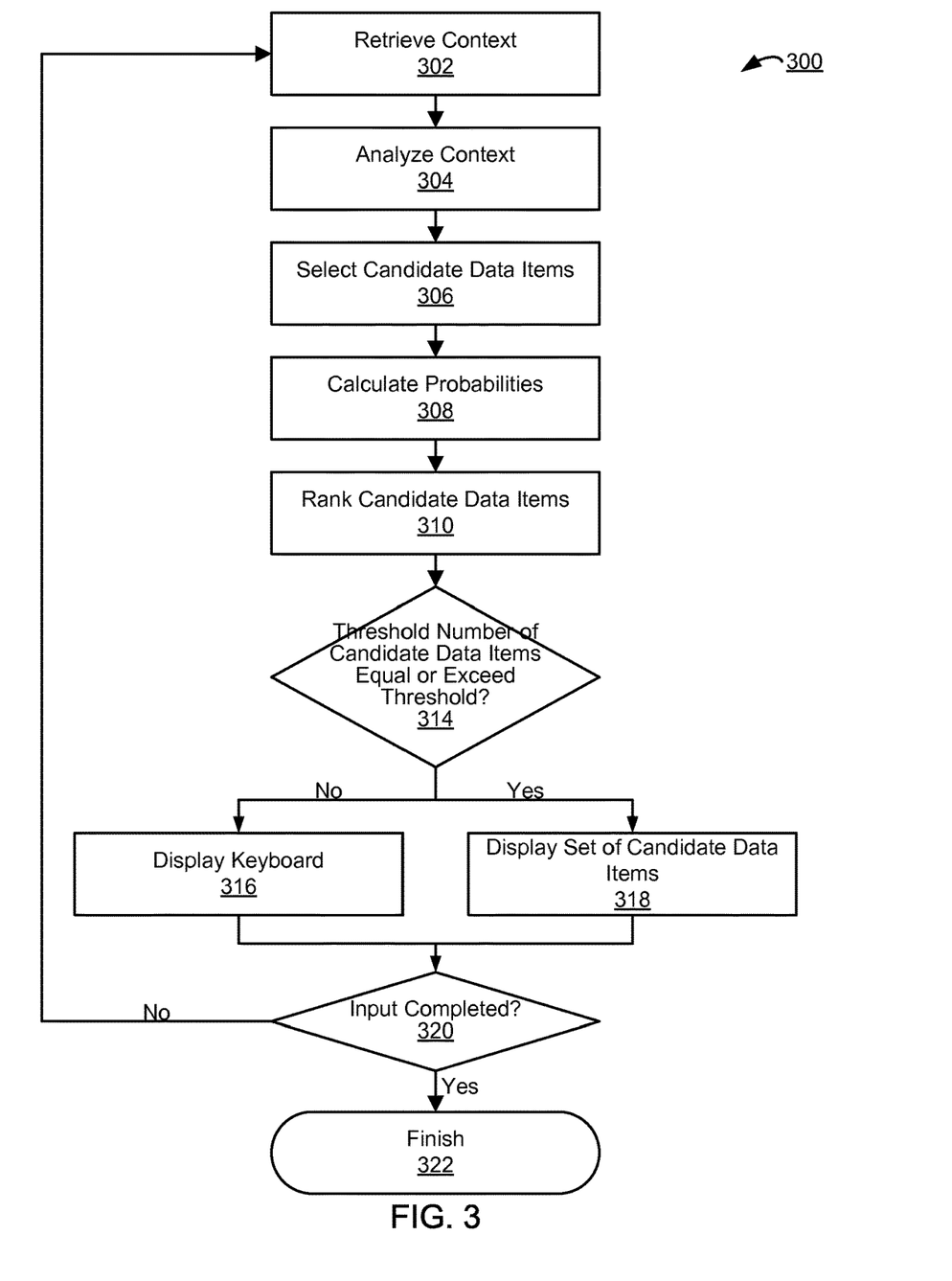
FIG. 3 is a flow chart of a method for presenting candidate data items based on received input, in accordance with an embodiment.

FIG. 3 is a flow chart of one embodiment of a method for identifying and displaying candidate content items based on received input. The received input describes a content object to be posted to social networking system 110, such as a message, a status update, a caption, or any other information capable of being represented as an object by social networking system 100. As social networking system 110 receives input from a user via composer interface 200, interface generator 114 retrieves 302 stored context associated with the user from which the input is received. As described above, the stored context associated with the user describes actions previously performed by the user and one or more characteristics associated with the user. For example context associated with the user includes content previously provided by the user, the user's location, the time when the user provides the input, input previously provided by the user from the same or a similar location, input received from other users at the same or a similar location. Other context associated with the user may include users with the user when the input is received.

Interface generator 114 analyzes 304 the retrieved context and the received input. For example, interface generator 114 extracts specific information or attributes from the retrieved context, such characteristics of the user, users connected to the user from which the input was received, a time when the information was received, a location associated with the user when the input was received, prior actions performed by the user from which the input was received, or other suitable attributes. For example, when a user posts "eating a great tasting hamburger", interface generator 114 may extract certain context from it, such as the user's current location (e.g., MCDONALD'S), the current time (e.g., noon), and whom the user was with. Additional examples of information from the context include: biographical data, interests, preferences, connections to other users, associations with groups, geographic location, temporal information, past actions by the user, prior locations of the user, and prior content provided by the user. Based on the context associated with the user and the input received (e.g., previously-received portion of the input such as characters) interface generator 114 selects 306 one or more candidate data items from the data item store 126. For example, interface generator 114 forms a predictive model for words or phrases that a user may use when providing input using the received input and the retrieved context. As additional portions of the input are retrieved, interface generator 114 selects 306 additional and/or different candidate data items based on the additional portions of the input. For instance, interface generator 114 may display "hamburger", "hash browns", "ham and cheese breakfast sandwich" and similarly related words when the user inputs "ha" while typing at a fast food restaurant. As the user continues typing and creates "ham", the selection of candidate data items may reduce to "hamburger" and "ham and cheese breakfast sandwich". The selection may be further enhanced through the use of the user's context and previous actions. In one embodiment, interface generator 114 may use the part of speech of words of data items when forming the predictive model.

In an embodiment, interface generator 114 retrieves candidate data items form data item store 126 based on the likelihood of the user including the candidate data items in the input based on the received portion of the input and the retrieved context. The candidate date items may include individual words and/or phrases of varying lengths. In some embodiment interface generator 114 may filter the candidate data items to remove words having less than a threshold likelihood of being included in the input (e.g., rare words, highly specialized words, foreign words, etc.). Interface generator 114 may filter candidate data items based on parts of speech. For example, interface generator 114 may determine that the candidate data items should include verbs based on the portions of the input already received. In this embodiment, interface generator 114 may prioritize verbs in the candidate data items or exclude candidate data items having other parts of speech. Interface generator 114 may also include a combination of various parts of speech (e.g., nouns, adjectives, adverbs, or a combination of the available parts of speech) in the candidate data items. Hence, the candidate data items may include words, phrases, or sentences.

After selecting 306 candidate data items, interface generator 114 calculates 308 probabilities for each candidate data item indicating the likelihood that the user will include the candidate data item in the input. These probability values are calculated 308 based on the retrieved context and the received portion of the input. For example, the predictive model discussed above may be used to determine the probability values. When calculating 308 probabilities for a candidate data item, interface generator 114 accounts for retrieved context information, such as previously provided content, previously selected data items, prior actions by the user, location from which the input was received, a time at which the information was received, or any other suitable information. Previously received portions of the input are used along with the context information to determine the probability of the user including a candidate data item in the input. For example, interface generator 114 may identify patterns of data items, such as words, previously provided to social networking system 110 by the user. Words, phrases, or other data items previously submitted to social networking system 110 may have a higher probability than data items infrequently used by the user. For example, if a user often posts comments about "delicious hamburgers", then data items such as "delicious hamburgers" and related data items may be assigned higher probabilities than a data item such as "greasy and disgusting hamburger" in response to the user typing "hamburger".

As another example, interface generator 114 identifies a location from the retrieved context and associates a higher probability with data items associated with the identified location. For example, if a user is providing input from a fast food restaurant, data items relating to fast food (e.g., hamburgers, fries, dessert, menu, drinks, line, wait, snacks, etc.) are assigned higher probability values than unrelated to fast food restaurants (e.g., beach, ski, winter, flying, weather, paperwork, bunny, etc.). Interface generator 114 may also account for the degree of word usage in common speech when calculating 308 probabilities for candidate data items. As additional portions of the input are received, the candidate data items are modified accordingly. For example, the number of candidate data items is reduced as additional portions of the input is received. Thus, interface generator 114 recalculates probabilities for data items as additional portions of the input are received.

Interface generator 114 ranks 310 the candidate data items based on their probabilities. A higher probability results in a higher ranking for a candidate data item. In some embodiments, other factors are used when ranking 310 the candidate data items. For example, interface generator 114 may identify a graph value of a candidate data item that indicates the value of the candidate data item to the social networking system 110. In an embodiment, data items that are more specific have a higher graph value than generic data items. For example, "food" has a low graph value while "hamburger" has a higher graph value, and "bacon hamburger" has a higher graph value than "hamburger." When graph value is used along with probability to rank 310 candidate data items, a higher graph value for "bacon hamburger" may have cause "bacon hamburger" to have a higher ranking than "hamburger," even if "hamburger" has a higher probability. In an embodiment, probability and graph values are weighted so that high values in one category do not offset low values in another. For example, even though the phrase "bacon hamburger with mayonnaise and mustard" has a high graph value, it may have a small enough probability that interface generator 114 assigns it a low ranking.

In some embodiments, interface generator selects a set of candidate data items based on the ranking so that a specified number of data items are presented. This allows candidate data items to be presented on devices with limited display area and to prevent cluttering a display with data items. In one embodiment, the set of candidate data items is selected based on a threshold probability, so that the set of candidate data items includes candidate data items having at least the threshold probability. In an embodiment, the threshold probability is a user-specific value so the threshold probability may vary for different users. In another embodiment, the threshold probability is dynamically changed as candidate data items are selected 306. For example, social networking system operators may limit the suggestions box 206 to including six data items. Interface generator 114 may modify the threshold probability to be the probability of the sixth-highest ranked data item. Hence, the threshold probability is the sixth-highest probability of the candidate data item, so the threshold probability may be modified based on the data items.

In some scenarios, less than a threshold number of candidate data items have at least the threshold probability. If interface generator 114 determines 314 that less than the threshold number of candidate data items have at least the threshold probability, interface generator 114 displays 316 a virtual keyboard along with the set of candidate data items. This allows a user to easily provide additional portions of the input that may be used to select 306 additional candidate data items. As additional portions of the input (e.g., characters) are received, interface generator 114 obtains additional information for selecting 306 candidate data items. However, if at least a threshold number of data items have at least the threshold probability, interface generator 114 displays 318 the set of candidate data items without displaying the virtual keyboard 210. In an embodiment, the interface generator 114 presents a keyboard button 208 along with the set of candidate data items to allow the user to easily provide additional input.

After receiving various portions of the input or receiving selections of candidate data items, interface generator 114 determines 320 whether the input is completely received. An input may be determined 320 to be completed based on various criteria. For example, an input is determined to be completed if the user submits the input to social networking system 110, cancels or deletes the input, stops providing input for at least a threshold amount of time, or any other suitable criteria. If the interface generator 114 determines 320 the input is not completely received (e.g., the user continues to provide input via composer interface 200), content is retrieved 302 and the steps described above are repeated using the additionally received portion of the input. When the input is determined 320 to be completed, the selection of candidate data items is finished 322.

While described above in conjunction with social networking system 110, the method described in conjunction with FIG. 3 may run on other types of system, such as a program executing on a computing device or on an online system. Programs receiving input, such as text input, entry may retrieve information associated with a user providing the input and suggest data items, such as words or phrases, based on the information associated with the user and the portion of the input received. For example, as a user inputs a file name to a search program executing on a computer, the computer retrieves information associated with the user and uses the retrieved information and the received portion of the file name to present suggestions for the completed file name to the user. Suggestions may be based on previous search histories, events or tasks associated with the user, the user's download history, files previously accessed by the user, or other suitable information. Online systems, such as online gaming sites or message boards, may similarly select and present data items to users based on a received portion of a received input and information associated with a user from which the portion of the input was received. This use of user information as well as received input allows users of a system to provide content to the system using a reduced number of inputs.

Selection and Ranking of Data Items

Figure 4:
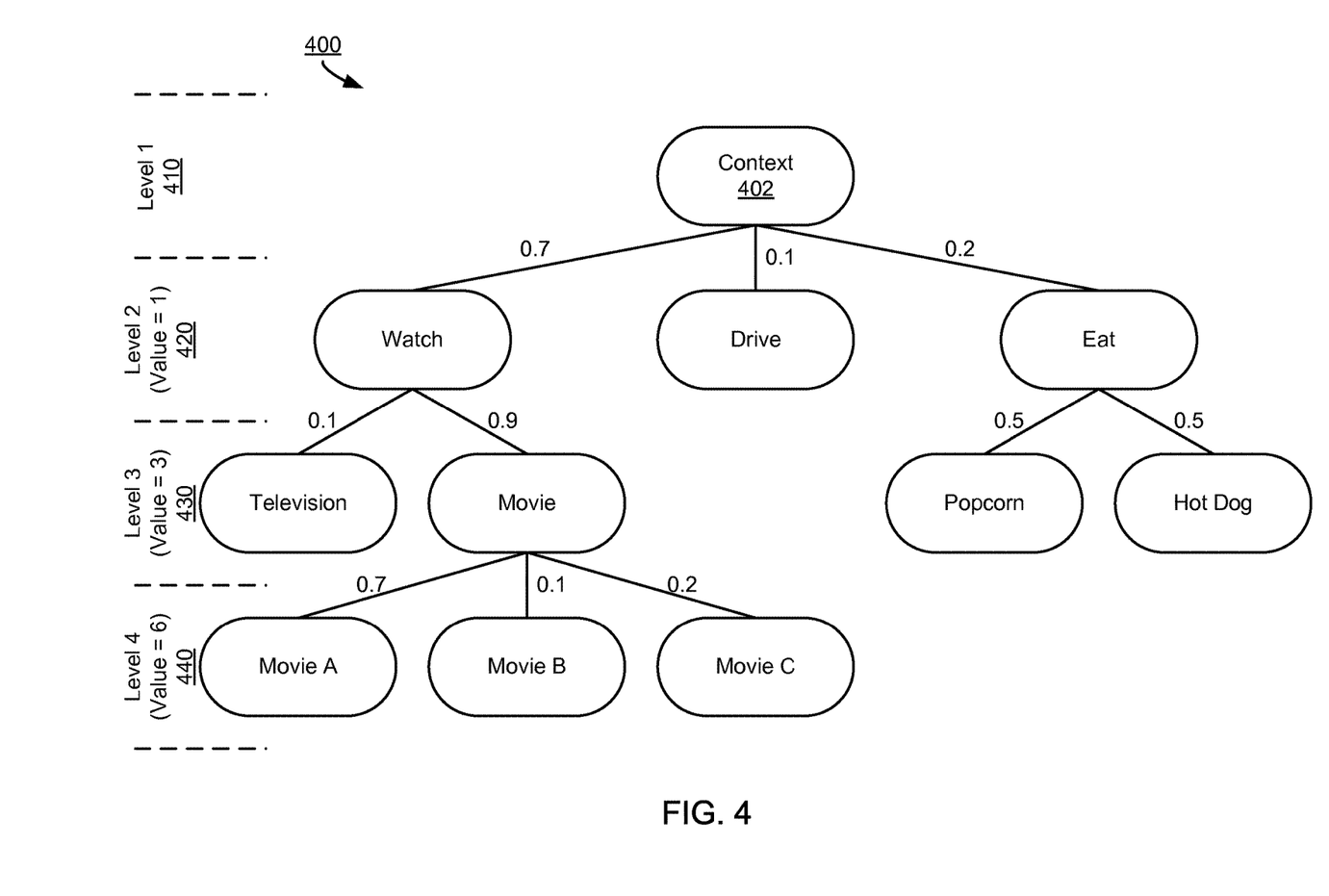
FIG. 4 is a visual representation of an example of ranking candidate data items based on user context, in accordance with an embodiment.

FIG. 4 is an example of ranking candidate data items based on user context. In the example of FIG. 4, the candidate data items are words; however, in various embodiments the candidate data items may be words, phrases, sentences, or any other suitable type of data. As shown in FIG. 4, the words are arranged in a tree structure and branches within the tree are associated with a probability indicating the likelihood of input including a word after a word in a higher level of the tree is received. As a user inputs characters or words into composer interface 200 interface generator 114 retrieves and analyzes context 402 associated with the user, which forms the first level 410 of the candidate data items. For example, words or phrases previously received from the user form the first level 410 of the candidate data items.

The context 402 may be related to, or decomposed into, different words forming a second level 420 of the candidate data items. Each word in the second level 420 is assigned a probability of being selected by the user based on a portion of the received input and the context information associated with the user, as described above in conjunction with FIG. 3. Words in the second level 420 may be further parsed, or associated with additional words, that comprise the third level 430 of the candidate data items. Probabilities assigned to words in the third level 430 are conditional on selection of a word from a higher level. For example, a 0.9 probability value for "movie" in the example of FIG. 4 is based on previous selection of "watch" by the user. While FIG. 4 shows four levels of words, in various embodiments the structure may have any number of levels with higher levels having an increasing degree of specificity.

In an embodiment, different levels may correspond to different parts of speech. For example, context associated with the user that is retrieved includes the subject of the sentence in a post, and interface generator 114 generates a list of verbs as the second level 420 of the candidate data items. When a verb is selected or received from the user, interface generator 114 presents candidate data items from a third level 430, which may correspond to a different part of speech, such as nouns. In some embodiments, interface generator 114 may determine that phrases comprising combinations of different parts of speech from different levels are suitable for presentation together as a candidate data item (e.g., combinations of verbs and nouns combinations). For example, interface generator 114 presents "watch movie" or "watch movie A" as possible suggestions in addition to "watch" in certain circumstances.

Selecting combinations of words spanning several levels creates candidate phrases having a lower probability of being selected because the probability of selecting two words is the product of the probabilities of selecting each word. The total probability, $P_{total}$, of selecting multiple words is calculated as:

$$P_{total} = \prod_{i}^{N} P_i,$$

where N is the most specific word on a branch, i is a word in a branch leading up to N, and $P_i$ is the probability of selecting word i in the branch. For example, using probability values shown in FIG. 4, interface generator 114 determines that the probability of "watch" being chosen is 0.7. However, the probability of "watching movie" is (0.7)(0.9), or 0.63, while the probability of "watching movie A" is (0.7)(0.9)(0.7), or 0.441. These probabilities may change based on additional portions of input received from the user or based on words selected by the user. For example, if the user begins a word with "w," interface generator 114 recalculates the probabilities shown on FIG. 4 so that "drive" and "eat" have a 0 probability of being selected while "watch" has a higher probability. Interface generator 114 may also retrieve additional words starting with "w" from data item store 126 and recalculate probabilities.

In some embodiments, probability values are weighted using other determining factors, such as graph value. As disclosed above, a graph value represents the value of a word or a phrase has to the social networking system 110. In one embodiment, more specific words have a larger graph value than less specific or more commonly used words. In the example of FIG. 4, different levels are associated with different graph values. For example, the second level 420 has a graph value of 1, the third level 430 has a graph value of 3, and the fourth level 440 has a graph value of 6. In other embodiments, graph values may be assigned based on individual words rather than on levels of words. For example, "drive" may have a different graph value than "eat," although both are in the second level 420. In some embodiments, graph values may be assigned to phrases. For example, "watch television" may have a higher graph value than "watch," "television," or "watch movie."

Graph values may be weighted with probability values through variations of expected value weighting. For example, a final ranking value, R, may be calculated as the product of a probability value $P_{total}$ and graph value G of the most specific word or phrase, or:

$$R = P_{total} G$$

For example, in FIG. 4 "watch" has a probability of 0.7 and a graph value of 1, resulting in a ranking value of (0.7)(1). As another example, "watching movie" has a ranking value of (0.7)(0.9)(3), and "watching movie A" has a ranking value of (0.7)(0.9)(0.7)(6). Hence, probabilities and graph values may affect the ranking of words and/or phrases. In the preceding examples, interface generator 114 may prioritize "watching movie A" over both "watching movie" and "watch" in displayed suggestions, even though "watching movie A" has a lower probability of being selected. In other embodiments, any suitable factors and weighting methods may be used to calculate a ranking value.

Data items may be further adjusted and reorganized based on additional probability factors, such as the probability of a user selecting a word (e.g., verb or object) for inclusion in a sentence if the word is presented to the user (a "presented word probability"). The presented word probability is based on the user being presented with the word, while the previously described probabilities are independent of the user being presented with a word. For example, a word may have a low probability of being selected without being presented to the user but may have a higher probability of being selected if presented to the user. The presented word probability may be based on the words or other input received, as well as prior use of the word by the user. In some embodiments, the presented word probability is used to determine the ranking of candidate data items.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    causing a composer interface to be presented at a user mobile device, the composer interface comprising an input box and a suggestion box;
    receiving input from a user at the input box, the input comprising at least a portion of content object to be posted to a social networking system;
    selecting one or more data items to be presented in the suggestion box of the composer interface for user selection, wherein selecting the one or more data items comprises:
        (i) logging context information associated with the user in the social networking system, the context information identifying one or more actions associated with the user, one or more characteristics of the user, and one or more geographic locations associated with the user,
        (ii) selecting one or more candidate data items stored by the social networking system, the selected candidate data items matching the content object portion received at the input box based at least in part on the stored context information,
        (iii) calculating a probability for each candidate data item, the probability indicating a likelihood of the candidate data item being included in the content object corresponding to the received input, the calculation based at least in part on the stored context information, and
        (iv) selecting the one or more data items from the candidate data items based at least in part on the calculated probabilities;
    modifying a size of the suggestion box of the composer interface based in part on a number of selected one or more data items; and
    presenting the selected one or more data items to the user in the suggestion box of the composer interface.

2. The method of claim 1, wherein the context information includes one or more selected from a group consisting of: a time when the input was received from the user, additional users connected to the user, actions previously performed by the additional users connected to the user, and any combination thereof.

3. The method of claim 1, wherein the received content object portion is associated with one or more of a location where and a time when the input was received.

4. The method of claim 3, wherein selecting one or more candidate data items stored by the social networking system comprises:
    selecting one or more candidate data items that correspond to the location associated with the received content object portion.

5. The method of claim 3, wherein selecting one or more candidate data items stored by the social networking system comprises:
    selecting one or more candidate data items that correspond to times within a threshold time of the time associated with the received content object portion.

6. The method of claim 1, wherein modifying the size of the suggestion box of the composer interface comprises:
    determining whether a threshold number of the selected one or more data items have at least a threshold probability; and responsive to less than the threshold number of the selected one or more data items having at least the threshold probability, decreasing a size of the suggestion box displaying the selected one or more data items.

7. The method of claim 1, wherein the selecting the one or more data items from the candidate data items based at least in part on the calculated probabilities comprises:
retrieving a graph value associated with each of the candidate data items; and
selecting the one or more data items from the candidate data items based on the calculated probabilities and the graph values.

8. The method of claim 1, wherein the selecting the one or more data items from the candidate data items based at least in part on the calculated probabilities comprises:
ranking the candidate data items based on the calculated probabilities; and
selecting the one or more data items based on the ranking.

9. A computer-implemented method comprising:
causing a composer interface to be presented at a user mobile device, the composer interface comprising an input box and a suggestion box;
receiving input from a user at the input box, the input comprising at least a portion of content object to be posted to a social networking system;
selecting one or more data items to be presented in the suggestion box of the composer interface for user selection, wherein selecting the one or more data items comprises:
(i) logging context information associated with the user in the social networking system, the context information identifying one or more actions associated with the user, one or more characteristics of the user, and one or more locations associated with the user,
(ii) selecting one or more candidate data items stored by the social networking system, the selected candidate data items matching the received content object portion received at the input box based at least in part on the stored context information and the received input,
(iii) calculating a probability for each candidate data item, the probability indicating a likelihood of the candidate data item being included in the content object corresponding to the received input, the calculation based at least in part on the stored context information, and
(iv) selecting the one or more data items from the candidate data items based at least in part on the calculated probabilities;
presenting the selected one or more data items to the user in the suggestion box of the composer interface;
receiving a selection of a data item of the presented one or more data items from the user; and
modifying additional data items presented to the user in the suggestion box based at least in part on the selection.

10. The method of claim 9, wherein the context information includes one or more selected from a group consisting of: a time when the input was received from the user, additional users connected to the user, actions previously performed by the additional users connected to the user, and any combination thereof.

11. The method of claim 9, wherein the received content object portion corresponds to one or more of a location where and a time when with the input was received.

12. The method of claim 11, wherein selecting one or more candidate data items stored by the social networking system comprises:
selecting one or more candidate data items that correspond to the location associated with the received content object portion.

13. The method of claim 11, wherein selecting one or more candidate data items stored by the social networking system comprises:
selecting one or more candidate data items that correspond to times within a threshold time of the time associated with the received content object portion.

14. The method of claim 11, wherein selecting one or more candidate data items stored by the social networking system comprises:
selecting one or more candidate data items associated with one or more users connected to the user and that correspond to the location associated with the received content object portion.

15. The method of claim 11, wherein selecting one or more candidate data items stored by the social networking system comprises:
selecting one or more candidate data items describing actions performed by the user and that correspond to the location associated with the received content object portion.

16. The method of claim 9, wherein the presenting the selected one or more data items to the user comprises:
determining whether a threshold number of the selected one or more data items have at least a threshold probability; and
responsive to less than the threshold number of the selected one or more data items have at least the threshold probability, decreasing a size of the suggestion box displaying the selected one or more data items.

17. The method of claim 9, wherein the selecting the one or more data items from the candidate data items based at least in part on the calculated probabilities comprises:
retrieving a graph value associated with each of the candidate data items; and
selecting the one or more data items from the candidate data items based on the calculated probabilities and the graph values.

18. The method of claim 9, wherein the selecting the one or more data items from the candidate data items based at least in part on the calculated probabilities comprises:
ranking the candidate data items based on the calculated probabilities; and
selecting the one or more data items based on the ranking.

19. The method of claim 9, wherein a candidate data item comprises one or more words.

20. The method of claim 19, wherein the selecting the one or more data items from the candidate data items based at least in part on the calculated probabilities comprises:
selecting one or more candidate data items stored by the social networking system based on the calculated probabilities, parts of speech of the candidate data items, and a part of speech of the received content object portion.

21. A computer-implemented method comprising:
causing a composer interface to be presented at a user mobile device;
receiving input from a user at the composer interface, the input comprising at least a portion of content object to be posted to a social networking system;

selecting one or more data items to be presented in the composer interface for user selection, wherein selecting the one or more data items comprises:

(i) logging context information associated with the user in the social networking system, the context information identifying one or more actions associated with the user, one or more characteristics of the user, and one or more locations associated with the user, (ii) selecting one or more candidate data items stored by the social networking system, the selected candidate data items matching the received content object portion at least in part based on the stored context information, (iii) calculating a probability for each candidate data item, the probability indicating a likelihood of the candidate data item being included in the content object corresponding to the received input, the calculation based at least in part on the stored context information, and (iv) selecting the one or more data items from the candidate data items based at least in part on the calculated probabilities;

presenting the selected one or more data items to the user in the composer interface.

22. The method of claim 1, further comprising modifying a size of at least one component of the composer interface based in part on the calculated probabilities of the selected one or more data items, wherein the modifying comprises:

determining whether a threshold number of the selected one or more data items have at least a threshold probability; and responsive to less than the threshold number of the selected one or more data items having at least the threshold probability, increasing a size of an input component of the composer interface.

23. The method of claim 22, wherein the input component of increased size is a virtual keyboard and the input component of original size is a button that displays the virtual keyboard when activated.

* * * * *